Feb. 18, 1969  R. ARMSTRONG  3,428,124
APPARATUS AND METHOD FOR SEALING DEEP WELLS
Filed Feb. 3, 1967
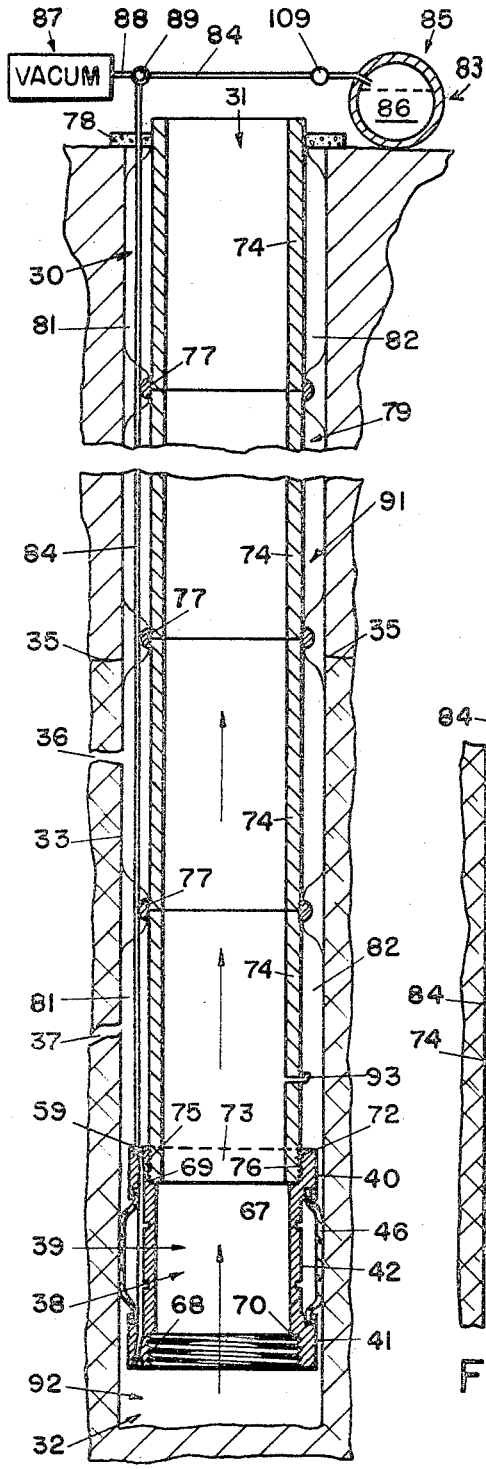
FIG. 1.
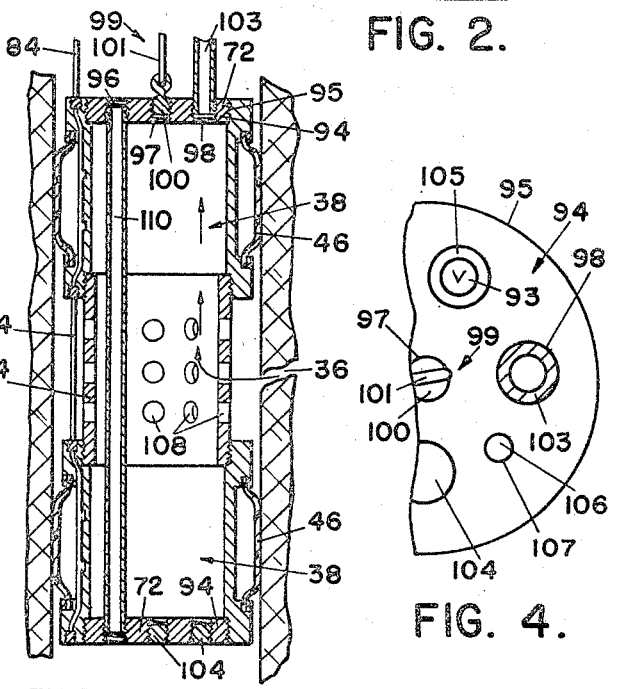
FIG. 2.
FIG. 3.
FIG. 4.
INVENTOR.
ROBERT ARMSTRONG
BY
*Pearson + Pearson*
ATTORNEYS United States Patent Office 3,428,124
Patented Feb. 18, 1969

3,428,124
APPARATUS AND METHOD FOR SEALING
DEEP WELLS
Robert Armstrong, Range Road, P.O. Box 274,
Windham, N.H. 03087
Filed Feb. 3, 1967, Ser. No. 613,817
U.S. Cl. 166—187                           9 Claims
Int. Cl. E21b 33/127

ABSTRACT OF THE DISCLOSURE

An artesian well testing, or sealing, apparatus, suspended at a desired depth at the end of a chain, rod, pipe, or the like and expanded to seal off the portion of the well above the seal. The elongated, rigid side wall of the hollow tubular seal is grooved to define an inflation chamber and the upper, inner end is recessed to firmly secure either a large diameter hollow pipe leading to the top of the well, or to firmly seat a tapped, plugged, insert disc which in turn receives a plurality of small diameter pipes leading to the top of the well. A check valve is mounted on the insert to equalize pressures and vacuum is used to release the seal.

Field of the invention

This invention relates to deep well packing and especially inflatable, tubular seals for sealing off a portion of an artesian well to isolate an influent vein containing contaminants, while passing pure water from the bottom to the top of the well.

Description of the prior art

It has heretofore been proposed to provide a hollow, tubular, sleeve arranged to encircle a sectional pipe within the bore of a deep well, for example in U.S. Patent 45,-822 to Fox of 1865, wherein both the inner and outer side walls of the sleeve are deformable by inflation to frictionally grip the pipe and the bore. A somewhat similar device is disclosed in U.S. Patent 2,629,446 to Freling of Feb. 24, 1953, there being inner and outer deformable side walls, with the pipe passing through the sleeve, but one end of the sleepe being fixed to the pipe while the other end is slidable on the pipe.

Summary of the invention

In this invention an expansible, hollow, seal is provided which includes a unitary, elongated, thin, cylindrical wall, corresponding to the rigid skirt of a conventional piston head. The thin wall includes a shallow elongated groove covered by a resilient diaphragm so that when fluid pressure is applied the diaphragm secures a firm engagement against a wide band of the bore of the well to effectively close any porous passages in the rough face of the well. No reliance is placed upon inflation, pressure, or friction gripping, to hold the seal at the desired depth. Instead an insert recess is provided in the upper end of the seal and an insert is secured therein, the inset being connected by non-stretchable means to the top of the well. The insert may be the bottom end of a sectional, finned, pipe of large diameter or it may be an apertured disc suspended by a chain, or rod, and having a plurality of pipes of small diameter seated in the apertures. The pipe of large diameter cannot twist or break and the chain, or rod, also cannot break, so that the risk of breakage of a fluid containing, small diameter pipe used for suspension purposes is avoided. Negative fluid pressure is used to assure the release of the seal when desired.

The principal object of the invention is to provide an apparatus and method for sealing off a portion of a deep well wherein a fluid expansible, cylindrical body is securely positioned at the desired depth, firmly expanded over sufficient area to effectively seal the relatively rough bore of the well and permanently protected against upward dislodgment in the well.

Other objects and advantages of the invention will be apparent from the claims, the description of the drawing and from the drawing in which:

FIGURE 1 is a diagrammatic, vertical, sectional view of a deep well with the seal of this invention installed therein.

FIGURE 2 is an enlarged, vertical view in half section of the hollow, cylindrical seal of FIGURE 1, but with a disc insert in place of the pipe insert.

FIGURE 3 is a view similar to FIGURE 1 showing a pair of seals, each with a disc insert, used for isolating and testing a contaminant vein, and FIGURE 4 is a fragmentary plan view of the disc insert shown in FIGURE 2.

A typical deep well 30, of the artesian type is shown in FIGURES 1 and 3, the well 30 having a top 31, at ground level, a bottom 32, which may be several hundred feet below ground level, and a bore, or cylindrical face 33 with a predetermined diameter such as six inches. Usually sectional, metal casings are inserted in well 30 to rest on ledge 35, thereby sealing off any upper level water, while lower level water may enter the well through veins such as 36 or 37 in the rock ledge 35.

The insertion of well casings is expensive and time consuming, since they must not only be driven into place but also must be sealed in a permanent manner by using a drive fit or by some crude packing system such as burlap or concrete. On the other hand it is essential to prevent upper level contaminants such as sewerage, road salt, minerals and the like from entering the well through low producing, upper level veins. It is most desirable in new or old wells to be able to isolate a particular vein, or well zone, to determine whether or not it is responsible for any influent contaminant and to avoid sealing off any veins which may be supplying potable water. Temporary sealing off of a vein for testing, and evaluation, requires not only that the seal be complete but also that the seal can be removed despite any adhesion thereof to the rough bore of the well.

The removable, expansible seal 38 of this invention includes the unitary, generally cylindrical, hollow, body 39, of rigid material such as metal, or plastic, having the relatively thin, side wall 40. The cylindrical, outer face 41, of wall 40, is of predetermined diameter less than the diameter of bore 33, the central portion of the exterior face being of reduced diameter to form a relatively wide, shallow, circumferential groove 42 extending between an upper exterior flange 43 and a lower exterior flange 44. A resilient, deformable, inflation member, or diaphragm 46 encircles the side wall 40, to cover the groove 42, the upper and lower peripheral portions 47 and 48, of the diaphragm 46, being seated in a suitable annular recess such as 49 and sealed therein by adhesive 50 and clamp rings 51 and 52 to form the inflation chamber 53.

It should be noted that the inflation chamber 53 is defined by the resilient diaphragm 46 and the rigid non-resilient walls of the fixed volume groove 42, so that all air pressure in the chamber is exerted to deform the diaphragm into the flattened configuration shown. Preferably the groove 42 and diaphragm 46 are at least equal in longitudinal dimension to the predetermined inner diameter of the inner face 54 of side wall 40. This is to assure that a relatively wide band of the bore of the well is contacted by the diaphragm 46, when expanded, to effectively seal against leakage despite any porous passages, roughness or the like in the well bore.

Each of the relatively thick upper and lower flanges 43 and 44 is drilled to form a fluid passage 55 or 56, each terminating at its outer end in a threaded recess 57 or 58, for receiving a threaded nipple 59 or threaded plug 60. The inner ends of the passages 55 and 56 connect with a longitudinally extending channel 61 in the face of the groove 42, the channel 61 connecting with a plurality of circumferential channels 62 or 63 to permit the chamber 53 to be completely exhausted of air and thereby flatten the diaphragm against the vertical face 64 of the groove 42.

Embossed, integral sealing ridges or rings 65 may be provided on diaphragm 46 if desired.

At each opposite end of the body 39, an insert-receiving recess 67 and 68 is provided, each within a flange 43 or 44 and each of cylindrical configuration with a diameter slightly greater than the inner diameter of the side wall 40. A shoulder such as 69 or 70 is thus formed for firmly seating an insert 72 of cylindrical configuration.

As shown in FIGURE 1, the insert 72 may be the lower, or terminal, end 73 of one hollow pipe section, or sleeve, 74, the end 73 being exteriorly threaded at 75 and secured in the internal threads 76 in the inner wall of the recess 67, at the upper end of the seal 38. A plurality of pipe sections, or sleeves, 74 are provided, sealed end to end by one of a plurality of annular sealing collars such as 77, of the threaded type, so that the seal 38 is securely suspended at the desired depth in the well by what I call a first tubular conduit through which potable water may flow from the bottom 32 of the well to the top 31 of the well. The top pipe section 74 is secured in any well known manner as by cement 78 if the installation of the seal is to be permanent.

The pipe sections 74 are preferably about four inches in internal diameter, so that an annular liquid chamber 79 is formed between the five inch external diameter of the pipe and the six inch diameter bore of the well. Each pipe section 74 includes at least three circumferentially spaced, longitudinally extending fins such as 81 and 82 which are integral and in contact with the well bore thereby preventing any flexing, twisting or breaking thereof while serving in its dual capacity as a large diameter liquid tubular conduit and as a suspension means for the seal 38.

Inflation means 83 is provided including a second tubular conduit 84, which may be of flexible material and sectional, the conduit 84 being connected to the nipple 59 and extending to the top 31 of the well and thence to a source of positive air pressure 85. Preferably source 85 is the upper portion of a conventional air compression tank 86 of the type used in household pumping systems, the compressed air being delivered to the tank by a suitable pump and providing pressure to force the water in the tank through the household system.

One of the principal features of this invention is the provision of a source 87 of negative air pressure, connected by a conduit 88 and valve 89 to the fluid conduit 84. When the seal 38 is lowered into the well, fixed to the end of a suitable number of pipe sections, and in deflated condition, the seal is accomplished by supplying air through conduit 84 to expand diaphragm 46 into firm sealing contact with the rough bore 33 of well 30. The portion 91, of well 30 above the seal thus forms the sealed annular chamber 79, in which any influent contaminants, for example from a low producing vein 36 or 37 is completely isolated, while potable water may pass upwardly from the portion 92 of the well through the pipe sections 74. The air conduit 84 passes through the space between the fins and performs no suspension function so that breakage is unlikely.

Prior art expansible, inflatable seals have been difficult to remove, even when deflated, because of adhesion of the resilient seal to the face of the bore and because when deflated, the resilient diaphragm may still tend to cause plugging. In this invention, the valve 89 is turned to shut off air and apply vacuum, which not only deflates the diaphragm but pulls it tightly inwardly against the base of the groove to assure no interference in withdrawing the seal.

A check valve 93 is provided on the insert 72, in this case the lower section 74, to permit water to pass into the chamber 79 if the static level rises sufficiently to exert an upward pressure on the seal. Water cannot pass through the check valve 93 from chamber 79 into the well despite the fact that there may be a head of several hundred feet of liquid in the chamber 79 exerting substantial downward pressure on the seal.

As shown in FIGURES 2 and 4 the insert 72 may be in the form of a plug, or disc, 94 threaded at 95 into the threads 76 of the insert receiving recess and having a plurality of tapped, threaded apertures such as 96, 97 and 98 extending therethrough. In external configuration, disc 94 is thus a cylinder corresponding to the cylindrical lower end 73 of a pipe section 74. The suspension means 99, in the case of a disc insert such as disc 94, includes a threaded plug 100 secured in the central aperture 97 and a non-stretchable metal chain, or sectional rod, 101 extending to the top 31 of the well for holding the seal 38 at the desired depth in the well. At least one tubular liquid conduit 103, in the form of a small diameter, sectional pipe is threaded into an aperture such as 98 to deliver potable liquid from a sealed zone of the well to the top thereof. The remaining apertures may contain threaded conduits, similar to conduit 103 for passing liquid, electric cables to submersible pumps or for other desired purposes. Any apertures, not used for conduits are closed by threadedly removable plugs such as 104 and check valve 93 is mounted on such a plug 105. The pattern of holes 96, 97 and 98 may be as desired, for example if a larger diameter pipe is preferred as the suspension means, the central tapped, threaded aperture 97 may be of larger diameter, with a ring of smaller holes in a pattern therearound.

The disc type, insert, installation must support substantially the entire head, or load, of water thereabove and is preferred for relatively low columns of water while the large diameter pipe insert of FIGURE 1 is preferred for relatively high columns of water above the seal. Preferably a vent line 106 extends from an aperture 107 in disc 94 to the top of the well and to the atmosphere, to prevent a partial vacuum below seal 38 during pumping of the well.

As shown in FIGURE 3, a plurality of seals 38, each with a disc insert 94 may be used to isolate a vein for testing and evaluation. The spaced pair of seals 38 are rigidly spaced apart by a pipe section 74 containing perforations 108, the perforations admitting water from the vein being tested. A pipe 110 connects the apertures 96 of each disc 94 to permit water below the pair of seals to rise above the pair of seals to balance pressures and avoid any tendency to lift, and unseal, the seals 38 due to a high water table, or level. Water from vein 36 passes through perforations 108, and up to the top of the well through pipe 103 for testing.

It will be noted that the seal 38 with its disc insert somewhat resembles a piston head with the elongated rigid cylindrical side wall 40 corresponding to the rigid skirt of the head and the disc 94 corresponding to the closed end of the piston head. However, the seal 38 is not intended to reciprocate in the bore 33, but is intended to be suspended at a predetermined level, inflatably sealed and vacuum deflated.

The pressure supply system must remain effective to form a permanent seal and the conventional air compression tank 86 normally operates at a pressure of about 40 p.s.i. A check valve 109 maintains this pressure in the conduit 88 despite fluctuations. However, the seal 38 is preferred for use in sealing off non-toxic contaminants such as salt, calcium or iron, and the like, rather than toxic contaminants which might represent a health hazard to domestic users, in view of possible leakage and mixing.

Well evaluation process

In order to determine the optimum level at which a well should be sealed, the following process is used. While the actual methods of testing may employ either the tapped plug 94 or sleeve 74 method with either jet or submersible pump; the basic process is the same. The well is sealed at an arbitrary level a few feet below the static water level. It is then pumped for a period of time from below the seal. From this procedure the recovery, or output, below this point may be determined up to the output of the pump under these conditions.

After sufficient pumping to purge residual effects of water which may have originally come from above the present seal location, test samples are taken and evaluated for comparison with original test samples taken before sealing. After sufficient evaluation of quantity below this point has been made and samples have been taken, the seal 38 is deflated with vacuum and lowered to another position for another evaluation of quantity and quality. By a series of such evaluations all characteristics of the well can be determined and the well can be sealed for use at the most advantageous level.

The type of sealing (sleeve 74 or plug 94) and type of pump used for evaluation are determined by the output characteristics of the well 30. For example, with high output low-level veins, quantity would not be a factor and a tapped plug 94 with either jet or submersible pump could be used with chain suspension from a winch. Changing the seal level could be accomplished in a minimum of time. However, with a low production well it would be desirable to always pump from the same position as close to the bottom as possible. Use of the tapped plug 94 would then involve changing the length of the connections between the seal and pump (probably a submersible would be used) for each successive stage of evaluation. Therefore, under these conditions it would probably be desirable to use a threaded sleeve 74. Removal of the pump would be required between each successive stage of evaluation, but by use of a winch, chain suspension, and flexible vacuum pressure line, this can be readily accomplished.

The actual testing of samples taken during the evaluation process may vary depending upon the water characteristics. From original samples it will have been previously determined which factors are undesirable in any given well and these must be carefully checked at each stage of evaluation. Some factors are readily evaluated in the field and may be checked at this time, while others require laboratory testing and will require taking of samples for this purpose.

What is claimed is:
1. A removable, expansible seal, for use in a deep well of predetermined diameter, said seal comprising:
   a unitary, hollow, generally cylindrical body of rigid material having
   a relatively thick, upper, exterior, integral flange;
   a relatively thick, lower, exterior, integral flange;
   a relatively thin, elongated, side wall of predetermined, interior and exterior diameter, integral with, and extending between, said flanges;
   said flanges and wall defining therebetween an annular, circumferential, shallow groove of fixed volume centrally of the exterior of said body and substantially equal in longitudinal dimension to the interior diameter of said wall;
   an insert-receiving, cylindrical recess in at least one of said flanges, having an interior diameter greater than the interior diameter of said wall;
   a resilient, seal member secured around the exterior of said body and covering said groove to form an elongated, shallow, inflation chamber of fixed volume therewith;
   inflation means, operable from the top of said well, for supplying fluid to said chamber, to seal said body against the wall of said well, and
   a cylindrical insert secured in said recess, said insert including suspension means extending to the top of said well for, suspending and selectively positioning said body at desired depths in said well.

2. A removable, expansible seal as specified in claim 1 wherein:
   said inflation means includes a fluid passage in at least one said flange, a pattern of longitudinal and circumferential, shallow channels in the exterior face of said side wall connecting with one end of said passage and a flexible tube connecting the other end of said passage with the top of said well,
   whereby said resilient seal member may be drawn by suction flatwise against said side wall to release said seal.

3. A removable, expansible seal as specified in claim 1 wherein:
   said insert is a disc of rigid material secured in said insert-receiving recess;
   said disc having a plurality of tapped, threaded holes therethrough each adapted to receive a threaded plug, or threaded tube, therein;
   whereby said disc prevents the passage of liquid through said hollow body while permitting the passage therethrough of desired fluids in said tubes.

4. A removable, expansible seal as specified in claim 1 wherein:
   said insert is one end of a hollow cylindrical pipe of less exterior diameter than the diameter of said well;
   said pipe extending to the top of said well and forming with the inner wall of said well, an annular liquid chamber sealed off from the bottom of the well.

5. A device as specified in claim 4 wherein:
   said pipe is sectional and each section thereof includes at least three longitudinally extending, projecting fins for positioning said pipe relative to the inner wall of said well.

6. A device as specified in claim 4 plus
   a check valve mounted on said insert, said valve permitting liquid to flow from the bottom of said well into the portion of said well sealed off by said body, but preventing liquid flow from said sealed off portion into the bottom of said well,
   whereby said seal is not dislodged by changes in static level of liquid in said well.

7. A removable, expansible seal, as specified in claim 1 wherein:
   said inflation means includes an air pressurized water tank, at the top of said well, a flexible tube connecting the upper portion of said tank with the inflation chamber of said seal, a source of negative air pressure at the top of said well and valve means for connecting said source to said inflation chamber;
   whereby said inflation chamber may be subjected to vacuum, to cause atmospheric air, or water pressure, to dislodge said seal for repositioning the same.

8. A removable, expansible seal, for sealing off a portion of an artesian well of predetermined diameter, said seal comprising:
   a unitary, hollow, tubular body of rigid material having a relatively thin cylindrical side wall with inner and outer faces of predetermined diameter, said inner face terminating at each opposite end in one of a pair of cylindrical, insert receiving recesses and each said recess having an inner diameter greater than the diameter of the inner face of said side wall;
   integral upper and lower flanges on the outer face of said body, said flanges defining a shallow annular groove therebetween having a longitudinal dimension substantially equal to the interior diameter of said side wall;

a resilient, annular, diaphragm member, encircling the outer face of said wall and secured thereto at top and bottom to form a fluid chamber of fixed volume therewith;

means operable from the top of said well, and passing through the rigid material of said flanged body, for introducing fluid to said fluid chamber to expand said member into firm sealing contact with the wall of said well;

an insert of rigid material, detachably secured in one of said insert receiving recesses;

and suspension means on said insert extending to the top of said well for positioning said seal at selected depths within said well.

9. Apparatus for testing the composition of individual contaminant veins flowing into an artesian well and for sealing off the same, said apparatus comprising:

a plurality of identical, piston-head shaped bodies, each having a depending integral skirt of rigid material; a resilient annular diaphragm encircling, and peripherally secured to said skirt to form a fluid pressure chamber therewith and a plurality of laterally spaced holes extending longitudinally therethrough, each threaded at each opposite end thereof to selectively receive a plug or a tube;

means for suspending at least two of said bodies at spaced vertical distances apart in a well to isolate an individual vein;

means operable from the top of said well to supply pressure to the fluid pressure chamber in each body to seal said body against the wall of the well;

tube means connected to a hole in the upper said body, and extending to the top of said well for withdrawing a sample of the liquid sealed between said bodies, and plug means in the remaining holes of both said bodies for closing the same during such sampling.

References Cited

UNITED STATES PATENTS

| 2,075,912 | 4/1937 | Roye | 166—187 |
| 2,600,173 | 6/1952 | Sewell et al. | 166—187 |
| 3,103,812 | 9/1963 | Bourne et al. | 166—187 |

FOREIGN PATENTS

| 656,991 | 1/1963 | Canada. |

JAMES A. LEPPINK, *Primary Examiner.*